US011216257B1

(12) United States Patent
Shetty et al.

(10) Patent No.: US 11,216,257 B1
(45) Date of Patent: *Jan. 4, 2022

(54) AUTOMATED CONFERENCE SESSIONS GENERATED TO MANAGE APPLICATION DEVELOPMENT

(71) Applicant: Intrado Corporation, Omaha, NE (US)

(72) Inventors: Santhosh Monappa Shetty, Omaha, NE (US); Karen Sue White, Omaha, NE (US)

(73) Assignee: Intrado Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,895

(22) Filed: Jul. 2, 2020

(51) Int. Cl.
*G06F 9/45* (2006.01)
*G06F 8/41* (2018.01)
*G06F 11/36* (2006.01)

(52) U.S. Cl.
CPC ............ G06F 8/41 (2013.01); G06F 11/3612 (2013.01)

(58) Field of Classification Search
CPC ...... G06F 8/41; G06F 11/3612; G06F 11/362; G06F 11/3624
USPC ......................................................... 717/140
See application file for complete search history.

(56) References Cited

U.S. PATENT DOCUMENTS

| 5,675,803 | A * | 10/1997 | Preisler | G06F 11/3624 714/E11.21 |
| 7,415,100 | B2 * | 8/2008 | Cooper | H04M 3/527 379/88.01 |
| 8,201,026 | B1 * | 6/2012 | Bornstein | G06F 11/0712 714/45 |
| 2002/0147969 | A1 * | 10/2002 | Lethin | G06F 9/45504 717/138 |
| 2003/0105809 | A1 * | 6/2003 | Yoshii | H04N 21/2543 709/203 |
| 2006/0041866 | A1 * | 2/2006 | Sivaram | G06F 11/362 717/124 |
| 2006/0059253 | A1 * | 3/2006 | Goodman | G06Q 10/06 709/223 |
| 2011/0035733 | A1 * | 2/2011 | Horning | G06F 21/125 717/140 |
| 2014/0149362 | A1 * | 5/2014 | Kearns | H04W 4/14 707/691 |
| 2014/0195396 | A1 * | 7/2014 | Bhakta | G06Q 40/02 705/35 |
| 2015/0286557 | A1 * | 10/2015 | Tsaur | G06F 11/302 717/128 |
| 2015/0370690 | A1 * | 12/2015 | Rodmell | G06F 11/008 717/124 |

(Continued)

OTHER PUBLICATIONS

Optimizing dynamically-dispatched calls with run-time type feedback, U Hölzle, Published on 1994.*

(Continued)

*Primary Examiner* — Chameli Das

(57) ABSTRACT

A method of operation may include compiling a code set via a compiler application, identifying one or more run-time errors associated with the compiled code set, identifying one or more user profiles linked to portions of the code set where the one or more run-time errors occurred, and automatically initiating a conference session with one or more devices associated with the one or more user profiles linked to the portions of the code set where the one or more run-time errors occurred.

17 Claims, 8 Drawing Sheets

(56) References Cited

U.S. PATENT DOCUMENTS

2018/0007060 A1* 1/2018 Leblang ............... H04W 12/06
2020/0097389 A1* 3/2020 Smith ................... G06N 3/084

OTHER PUBLICATIONS

Fast, effective dynamic compilation author J Auslander; published on 1996.*
Real-time collaborative coding in a web IDE, author: M Goldman dated: published on 2011; source: ACM. Org.*
Visualizing compiled executables for malware analysis, author: DA Quist published on 2009; source: IEEE.*

* cited by examiner

440

AUTOMATED CONFERENCE SESSIONS GENERATED TO MANAGE APPLICATION DEVELOPMENT

BACKGROUND

Conventionally, software development may be the product of many individual workstations and corresponding user profiles which accessed and contributed to the development process. Most information regarding the development process is easily tracked/logged by a management entity, such as a management server. As users contribute to a software build/application, the lines of code, time spent and errors identified (i.e., run-time errors) during a compilation procedure may be used to determine whether one or more user profiles were a participant to a portion of the code that is not operational and/or whether the user profiles have fulfilled their contribution expectations.

In the example with multiple sites operating similar software builds, those software builds may be identified and tested prior to updating other sites to ensure errors are resolved prior to attempting an upgrade or modification to other existing sites.

SUMMARY

Example embodiments of the present application provide at least a method that includes one or more of compiling a code set via a compiler application, identifying one or more run-time errors associated with the compiled code set, identifying one or more user profiles linked to portions of the code set where the one or more run-time errors occurred, and automatically initiating a conference session with one or more devices associated with the one or more user profiles linked to the portions of the code set where the one or more run-time errors occurred.

Another example embodiment of the present application may include an apparatus that includes a processor configured to compile a code set via a compiler application, identify one or more run-time errors associated with the compiled code set, identify one or more user profiles linked to portions of the code set where the one or more run-time errors occurred, and automatically initiate a conference session with one or more devices associated with the one or more user profiles linked to the portions of the code set where the one or more run-time errors occurred.

Another example embodiment may include a non-transitory computer readable storage medium configured to store instructions that when executed cause a processor to perform one or more of compiling a code set via a compiler application, identifying one or more run-time errors associated with the compiled code set, identifying one or more user profiles linked to portions of the code set where the one or more run-time errors occurred, and automatically initiating a conference session with one or more devices associated with the one or more user profiles linked to the portions of the code set where the one or more run-time errors occurred.

Still another example embodiment may include a method that includes one or more of identifying one or more errors of a code set executing at a test site, initiating a conference session with one or more devices assigned to manage the test site, receiving one or more modified portions of the code set from the one or more devices, executing the one or more modified portions of the code set to initiate a communication to the test site, and when the modified portions of the code set are free from errors, cancelling the conference session.

Still yet another example embodiment includes an apparatus that includes a processor configured to identify one or more errors of a code set executing at a test site, initiate a conference session with one or more devices assigned to manage the test site, a receiver configured to receive one or more modified portions of the code set from the one or more devices, and the processor is further configured to execute the one or more modified portions of the code set to initiate a communication to the test site, and when the modified portions of the code set are free from errors, cancel the conference session.

Still yet a further example embodiment may include a non-transitory computer readable storage medium configured to store instructions that when executed cause a processor to perform identifying one or more errors of a code set executing at a test site, initiating a conference session with one or more devices assigned to manage the test site, receiving one or more modified portions of the code set from the one or more devices, executing the one or more modified portions of the code set to initiate a communication to the test site, and when the modified portions of the code set are free from errors, cancelling the conference session.

DETAILED DESCRIPTION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments.

For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to provide operations to identify active code sets which may require modifications to correct operational errors, such as run-time software compilation errors identified from a complier application that attempts to run the code and create a result. Automated conferences may be created by identifying those user profiles or other parties and determining whether the contributors were part of the code creation effort to create portions of the code where the errors occurred. This also provides a way to track participation by various contributors to determine whether contributions were adequate based on the code status.

Figure 1:
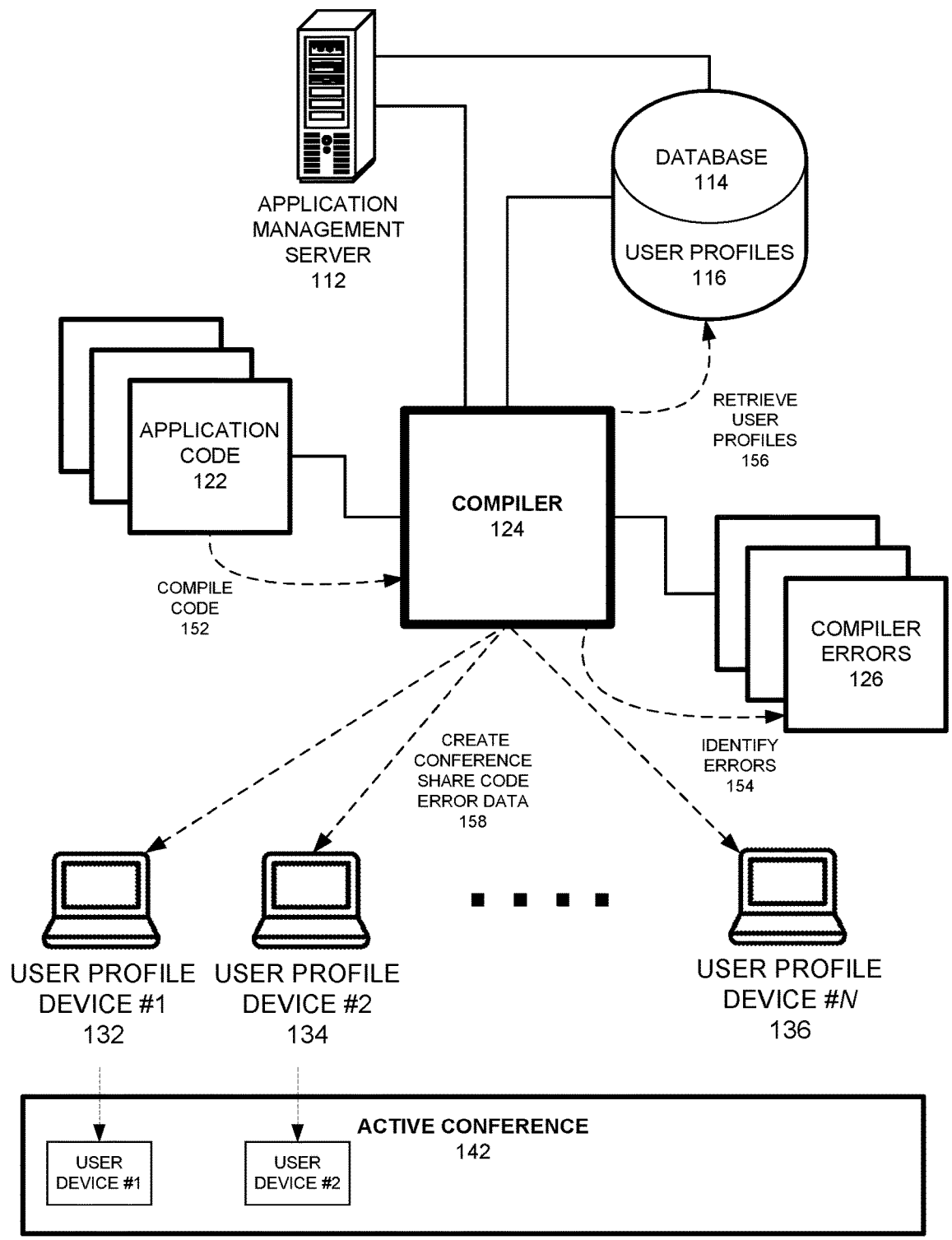
FIG. 1 illustrates an example network configuration for managing application development and related conference sessions according to example embodiments.

FIG. 1 illustrates an example network configuration for managing application development and related conference sessions according to example embodiments. Referring to FIG. 1, the system configuration 100 includes an application management server 112 which may include a database 114 and/or compiler 124. The compiler 124 may receive a set of application code 122 to compile 152, such as a current software build and may compile the code to identify run-time errors 154. The compiler errors 126 that result may be logged in the database 114 as a set of errors along with the corresponding user profiles 116, which are retrieved 156 responsive to the identified compiler (i.e., run-time) errors.

When retrieving user profile information 116, the errors may be identified as being part of code which correlates to a particular line of the code, a particular time when the code was edited, a user profile which wrote the code, etc., so that the correct user profiles are retrieved based on the corresponding code errors. Once the contributing user profiles are known, the user devices corresponding to the user profiles may be identified to create an automated conference and to share the error data 158 with those user profile devices 132-136 which are linked to the user profiles of interest. An active conference 142 may start at a particular time and the user devices which are invited/requested to join the conference may be actively participating in the conference to share information which could correct the identified errors. Once the user devices have joined the conference, the portions of the code which are related to the run-time errors and which are identified as having been written by the corresponding user profiles may be forwarded to the user devices for correction purposes. The user device #1 132 may receive those portions of the code which have errors and which are portions of the code that the user profile device 132 actually contributed to during the code creation/editing process. Other errors identified which are based on code created by another user profile and device may be forwarded to that particular user profile device (e.g., 134 . . . 136) depending on the work records identified from the database 114.

In one example, code is identified, compiled and processed to determine whether there are any run-time errors, and which user profiles contributed to those portions of the code with the identified errors. Next, a conference is initiated responsive to such an identification process. Invites, alerts, etc., are then created and used to communicate with the devices associated with those user profiles which were linked to the errors. The sections of the code with the errors are copied and forwarded to the devices in the session for a real-time opportunity to fix those sections. The conference may also have a compiler plug-in, such as an API that provides a compiler interface to compile the code as it is modified during the session. As the corrected sections are identified and received, they are recompiled and the session is ended once the errors are not present in the re-compiled code. Those user profiles which are logged in a work log as having worked on the error having portions of the code and/or which are part of the majority of errors may be selected for the conference over other user profiles.

Figure 2:
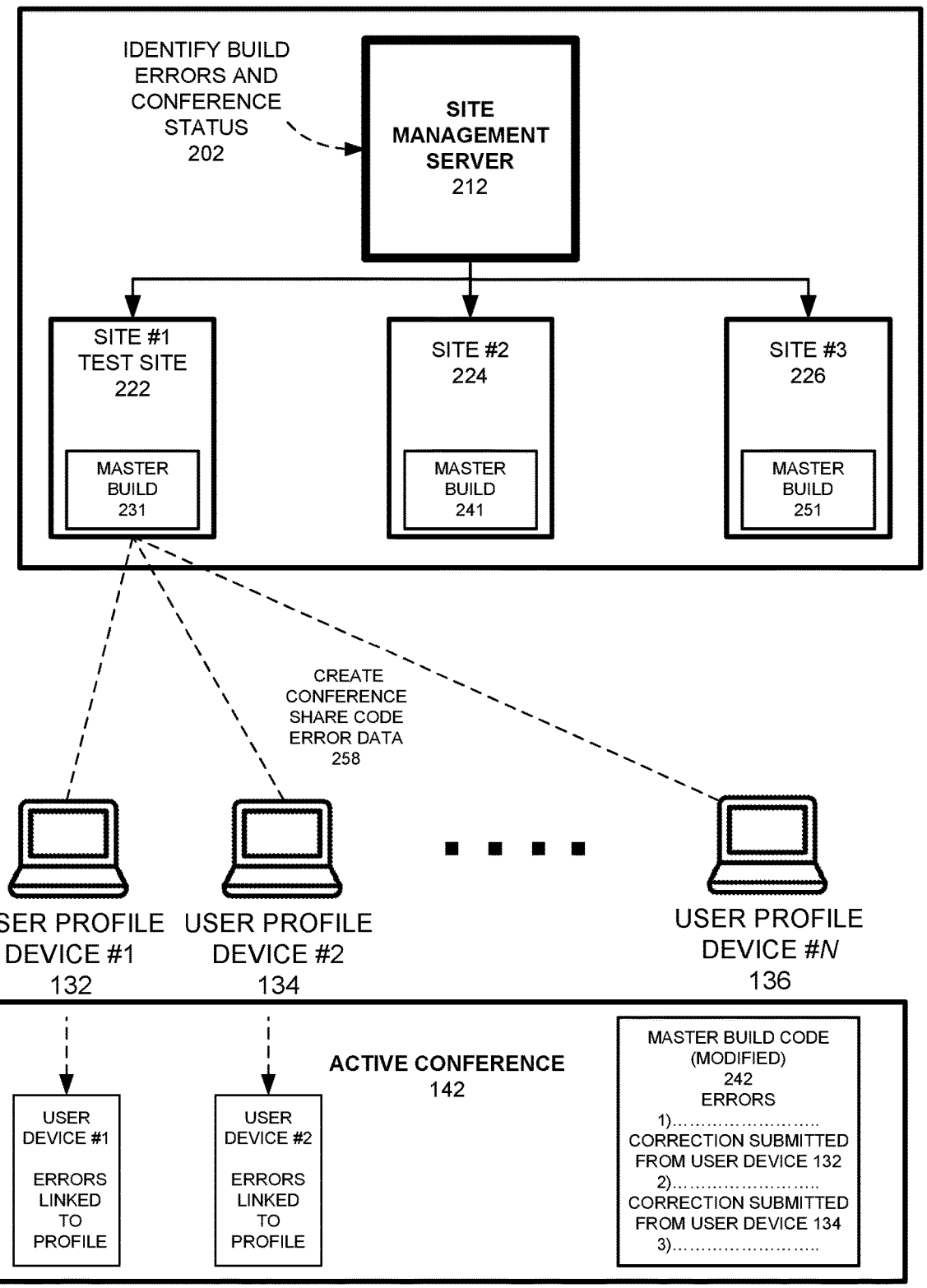
FIG. 2 illustrates another example network configuration for managing application development and conference sessions for updates to multiple sites according to example embodiments.

FIG. 2 illustrates another example network configuration for managing application development and conference sessions for updates to multiple sites according to example embodiments. Referring to FIG. 2, in this configuration 200 the code errors may be part of a build which is identified and used to replicate code to other builds at other sites and to initiate a conference 202. The site management server 212 may be a third party that is setup to manage the sites, such as public safety access points (PSAPs), in one example. The sites may have one site 222 that is the test site for a particular software build 231. The other sites 224, 226, etc., may be active sites that are operating with their own builds 241/251 during testing of a test site 222. When errors are identified at the test site 222, the master build 231 being tested may be compiled and examined to identify which portions of the code have errors or to identify what errors occurred. The conference may be automatically setup to include one or more management clients 132-136, which are managed by the site management server 212 to provide management services. The site management server 212 may create the conference and share the code having the errors 258 with the devices responsible for managing that code. The active conference 142 may then include active participation by the user profiles and their devices to communicate solutions to the code errors, such as a conference compiler interface 242 that may receive modified code portions identified during the meeting and placed in a common compiler interface. The code can be recompiled during the meeting as part of the meeting interface via an application programming interface (API) plug-in of the meeting interface application.

When the master build 231 that is under review/modification due to errors, testing, etc., is identified as being finalized or ready for live use, the site management server may identify the changes made and determine whether the master build 231 is ready to be replicated to the other sites 224/226, and if so, the other sites may receive an update build that overwrites to current builds with the updated software.

Figure 3A:
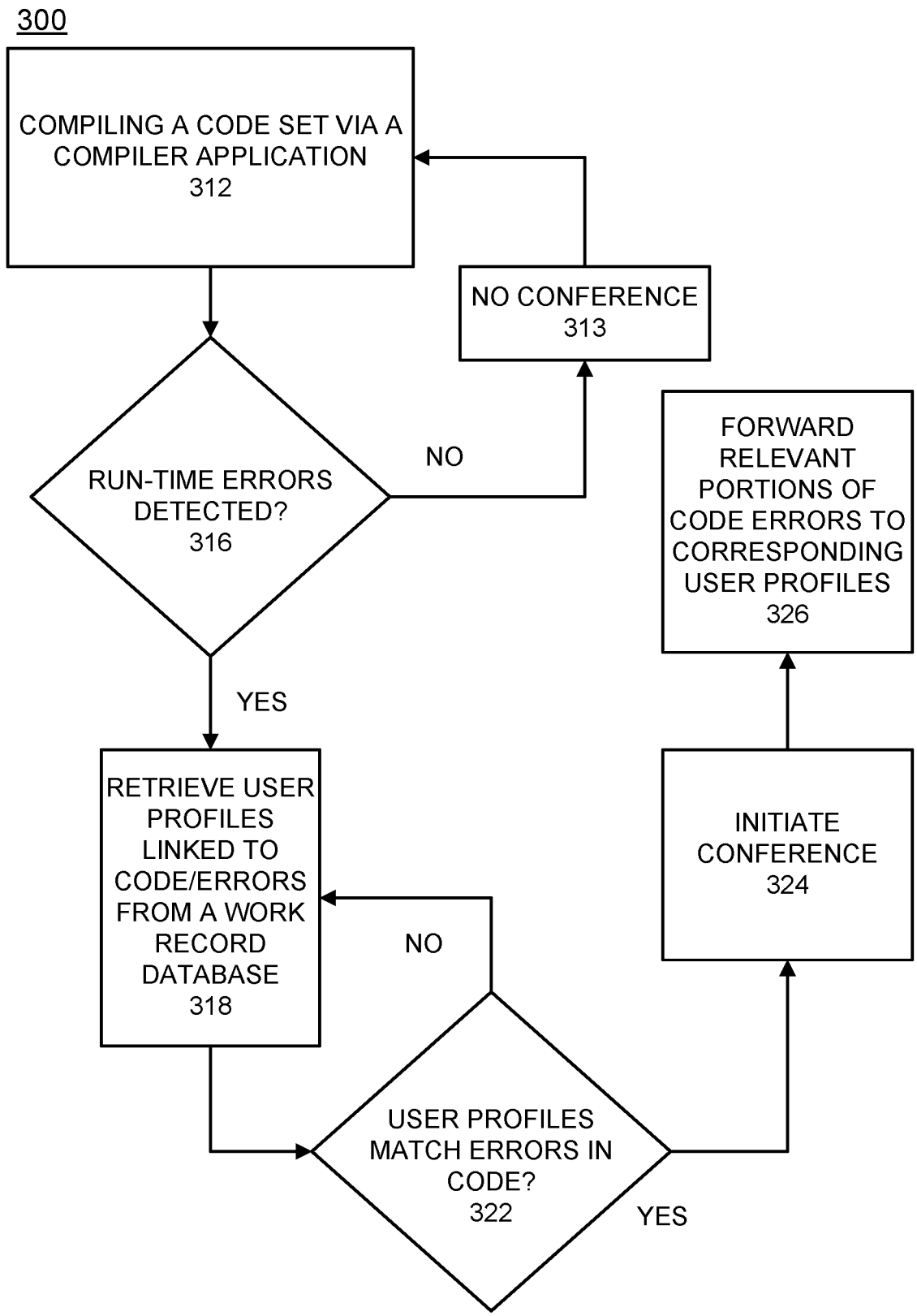
FIG. 3A illustrates an example logic flow diagram of application management and conference session configuration according to example embodiments.

FIG. 3A illustrates an example logic flow diagram of application management and conference session configuration according to example embodiments. Referring to FIG.

3A, the process 300 may include compiling a code set via a compiler application 312 to identify errors. The process may further include identifying one or more run-time errors associated with the compiled code set 316, when no errors are found, no conference 313 may be initiated. When errors are found, the process may provide identifying one or more user profiles linked to portions of the code set where the one or more run-time errors occurred 318. The association of user profiles and the code may be from a work log that records each time a user profile logged into the application software attempts to add, remove and/or change data on a particular date, time and/or at a particular location in the software code. Those profiles which match the errors in the code are identified 322 and used as the basis for inviting certain user devices to a conference session. The process may also include automatically initiating a conference session 324 with one or more devices associated with the one or more user profiles linked to the portions of the code set where the one or more run-time errors occurred.

In one example, the conference session is automatically initiated when the one or more run-time errors are deemed critical, and one way to identify critical errors is by identifying whether the errors include critical variables which are included in a list and/or which are used a threshold number of times in the software application. For example, those variables which are included in the code a threshold number of times may be deemed critical. The errors which include critical errors may be the errors which are used to identify the user profiles associated with those errors and to include in the conference session as opposed to identifying all user profiles linked to all errors, just those critical errors may be the basis of the conference.

Once the user profiles are identified to be included in the conference session, those portions of the code which are selected and are the basis for the conference content are copied and forwarded 326 to the one or more devices during the conference session. Also, a master code portion may be used to demonstrate the code portions as part of the conference session. The session may also have indicators for those active user profiles participating in the session. The process may also include receiving modified portions of the code set from the one or more devices, compiling the modified portions of the code set as part of the session, and when the compiled modified portions of the code set are free from run-time errors (i.e., there are no errors after re-compilation), the process may close the conference session and forward the modified portions of the code set to a master build of the code set. The one or more user profiles may include information, such as a creation record of one or more portions of the code set, a plurality of times and dates associated with the creation of the one or more portions of the code set, the lines of the code added and other records that document the code. The process may also include transmitting conference invite messages for the conference session to the one or more devices associated with the one or more user profiles which are linked to portions of the code set where the run-time errors occurred and which exceed a threshold number of the run-time errors.

Figure 3B:
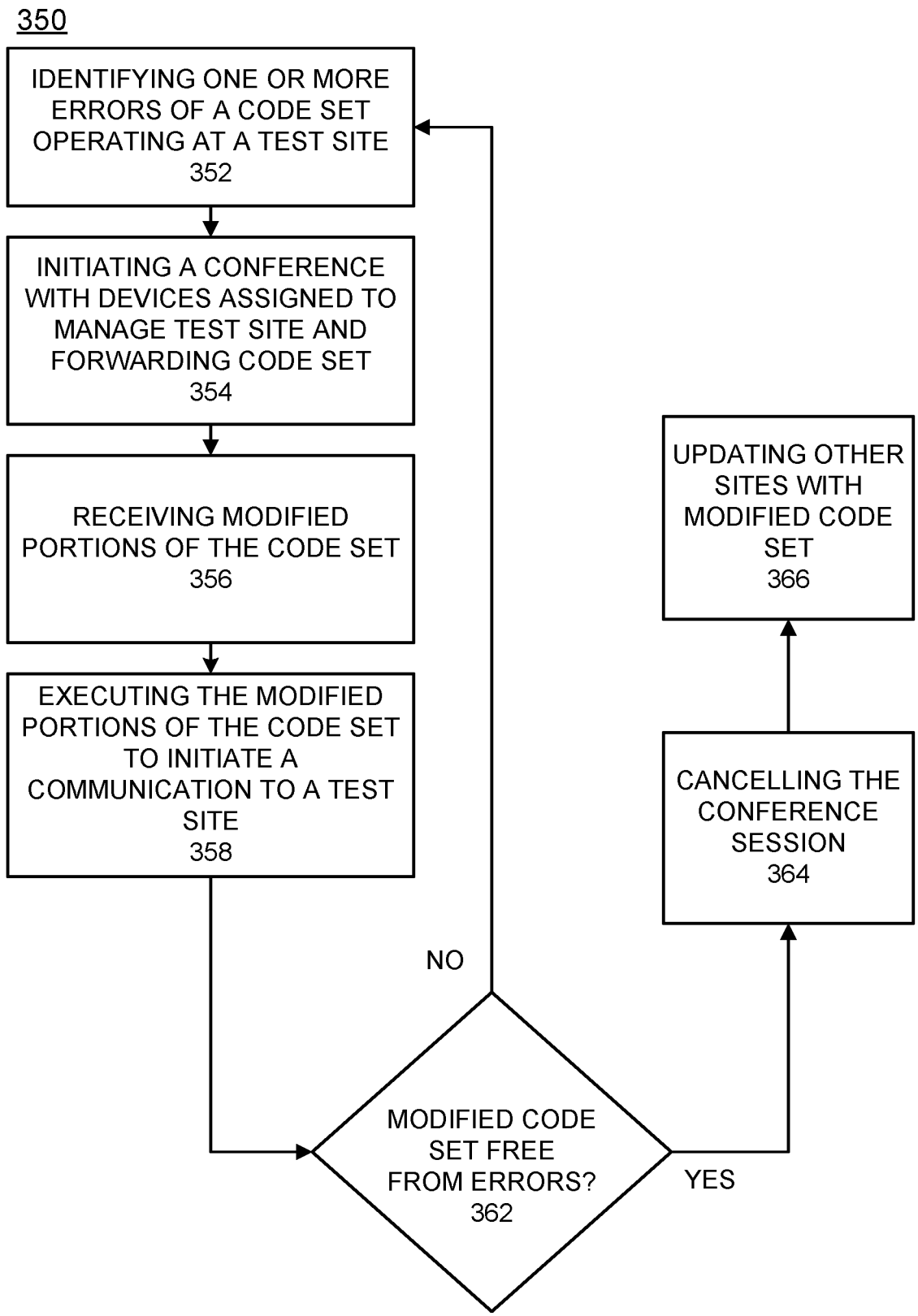
FIG. 3B illustrates another example logic flow diagram of application management and conference session configuration according to example embodiments.

FIG. 3B illustrates another example logic flow diagram of application management and conference session configuration according to example embodiments. Referring to FIG. 3B, the process 350 includes identifying one or more errors of a code set executing at a test site 352, initiating a conference session with one or more devices assigned to manage the test site 354, receiving one or more modified portions of the code set from the one or more devices 356, executing the one or more modified portions of the code set to initiate a communication to the test site 358, and when the modified portions of the code set are free from errors 362, cancelling the conference session 364. In another example, when the modified portions of the code set are free from errors, updating a master version of the code set to include the modified portions of the code set 366, and forwarding the master version of the code set to a plurality of site devices corresponding to a plurality of sites managed by a central site manager, and the plurality of site devices may be public safety access points (PSAPs). In one example, the one or more errors may include one or more of a delay in the communication being received at the test site, an incorrect PSAP having received the communication, and a run-time error of a compiled application associated with the software code.

The process may also include forwarding portions of the code set having the one or more errors to the one or more devices registered as having accessed the portions of the code set. This may include retrieving a contribution log associated with the code set, determining, via the contribution log, a plurality of user profiles which contributed to the code set, determining a contribution score for each of plurality of user profiles based on a function of contribution elements performed by each of the plurality of user profiles, creating a compilation report having the one or more user profiles, and the compilation report includes a plurality of contributions scores corresponding to the plurality of user profiles, and determining whether the one or more user profiles have fulfilled threshold contribution obligations to the code set. The contribution elements can include a logged time spent when creating the code set, a number of errors assigned to each of the one or more user profiles which are identified from the compiled code set, and a number of lines of code of the code set created by each of the one or more user profiles. The contribution elements in the function may be weighted differently and may have positive and negative attributes.

In one example, if a user profile has a required 'X' lines of code on a particular project, a required 'Y' number of hours, a maximum number 'Z' of run-time errors not to exceed, etc., as part of the user profile requirements, then the contribution score for that user profile may be 100 if all such parameter thresholds for those categories are satisfied. However, if the user profile has logged too many errors (i.e., above the threshold number), then the user profile may be flagged for requiring additional corrections to errors prior to the user profile fulfilling certain work requirements. In that case, the user profiles which have failed to meet their work requirements may be selected to correct the errors identified in the current code compilation effort. Once the errors are corrected, those user profiles which contributed during a meeting conference session may be credited with the effort and the contribution scores may increase to satisfy the work requirements.

Figure 4A:
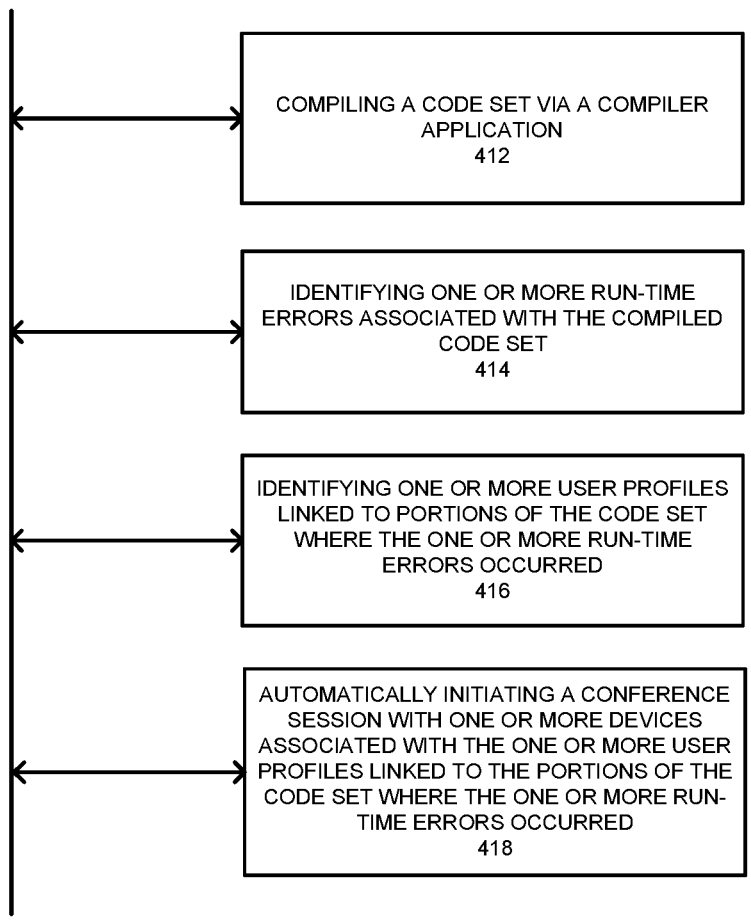
FIG. 4A illustrates an example flow diagram of application management and conference session management according to example embodiments.

FIG. 4A illustrates an example flow diagram of application management and conference session management according to example embodiments. Referring to FIG. 4A, the process 400 may include compiling a code set via a compiler application 412, identifying one or more run-time errors associated with the compiled code set 414, identifying one or more user profiles linked to portions of the code set where the one or more run-time errors occurred 416, and automatically initiating a conference session with one or more devices associated with the one or more user profiles linked to the portions of the code set where the one or more run-time errors occurred 418.

Figure 4B:
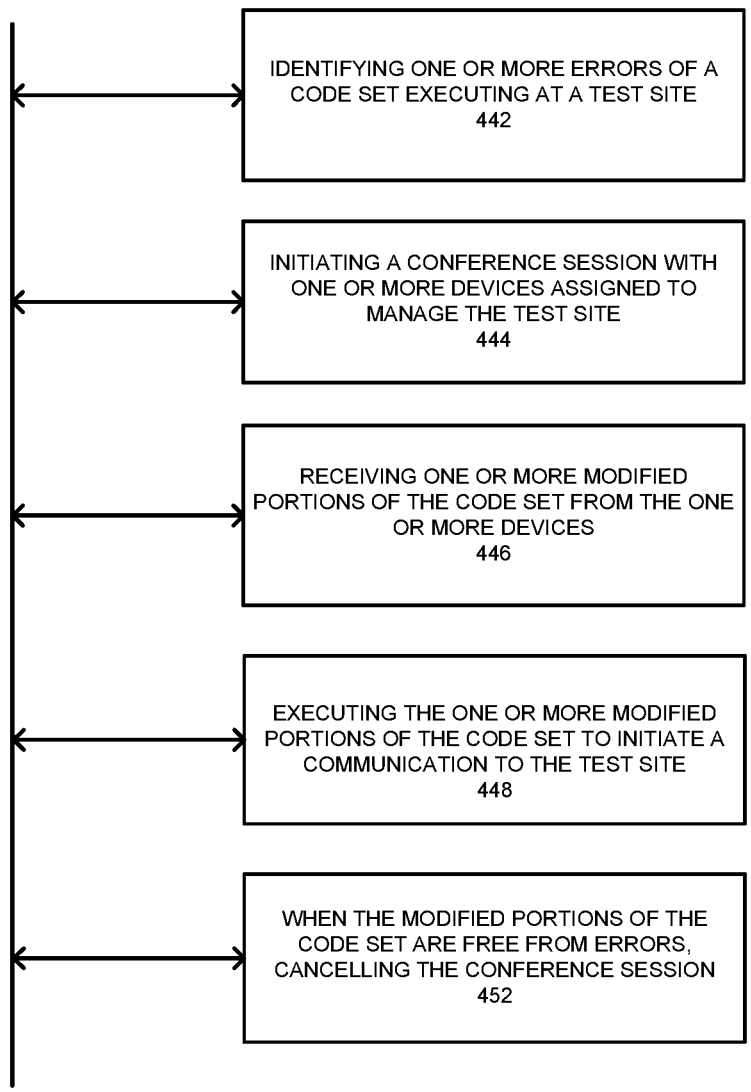
FIG. 4B illustrates another example flow diagram of application management and conference session management according to example embodiments.

FIG. 4B illustrates another example flow diagram of application management and conference session management according to example embodiments. Referring to FIG. 4B, the method 440 may include identifying one or more errors of a code set executing at a test site 442, initiating a conference session with one or more devices assigned to manage the test site 444, receiving one or more modified portions of the code set from the one or more devices 446, executing the one or more modified portions of the code set to initiate a communication to the test site 448, and when the modified portions of the code set are free from errors, cancelling the conference session 452.

Figure 5:
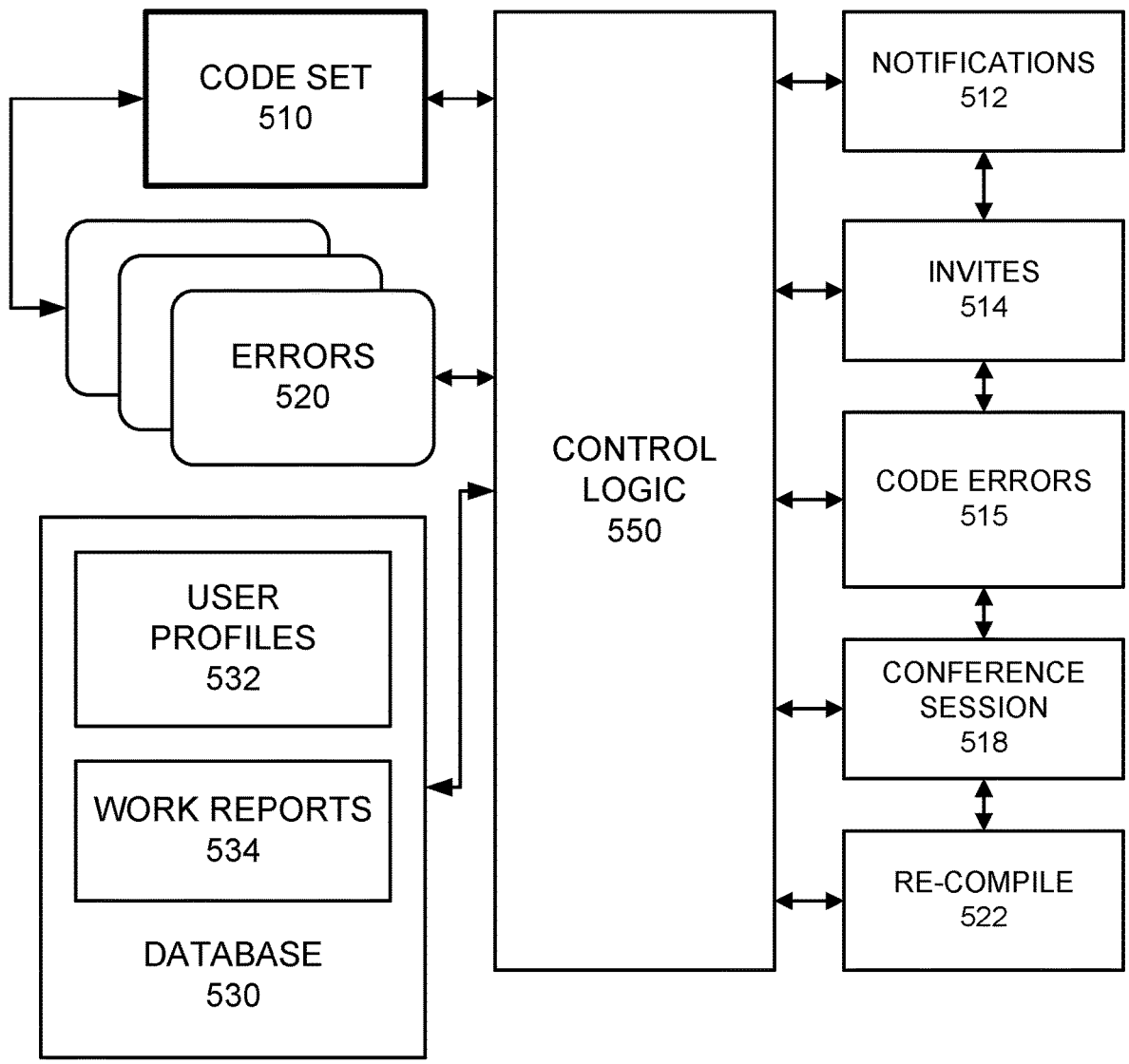
FIG. 5 illustrates an example logic process diagram of input and output parameters which are processed during an alternative communication scenario according to example embodiments.

FIG. 5 illustrates an example logic process diagram 500 of input and output parameters which are processed during an alternative communication scenario according to example embodiments. Referring to FIG. 5, the logic processor 550 may receive various inputs, such as a code set 510 for compilation purposes, errors produced from the code set 520 and a database 530 of information, such as user profiles 532 of those working with the code and work reports 534 which document the code. During a code management session, certain information may be created, such as notifications to interested parties 512, invites to conferences sessions 514, code errors from compilations 515, conference sessions 518 and a re-compilation of the code 522 based on modifications to the code.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
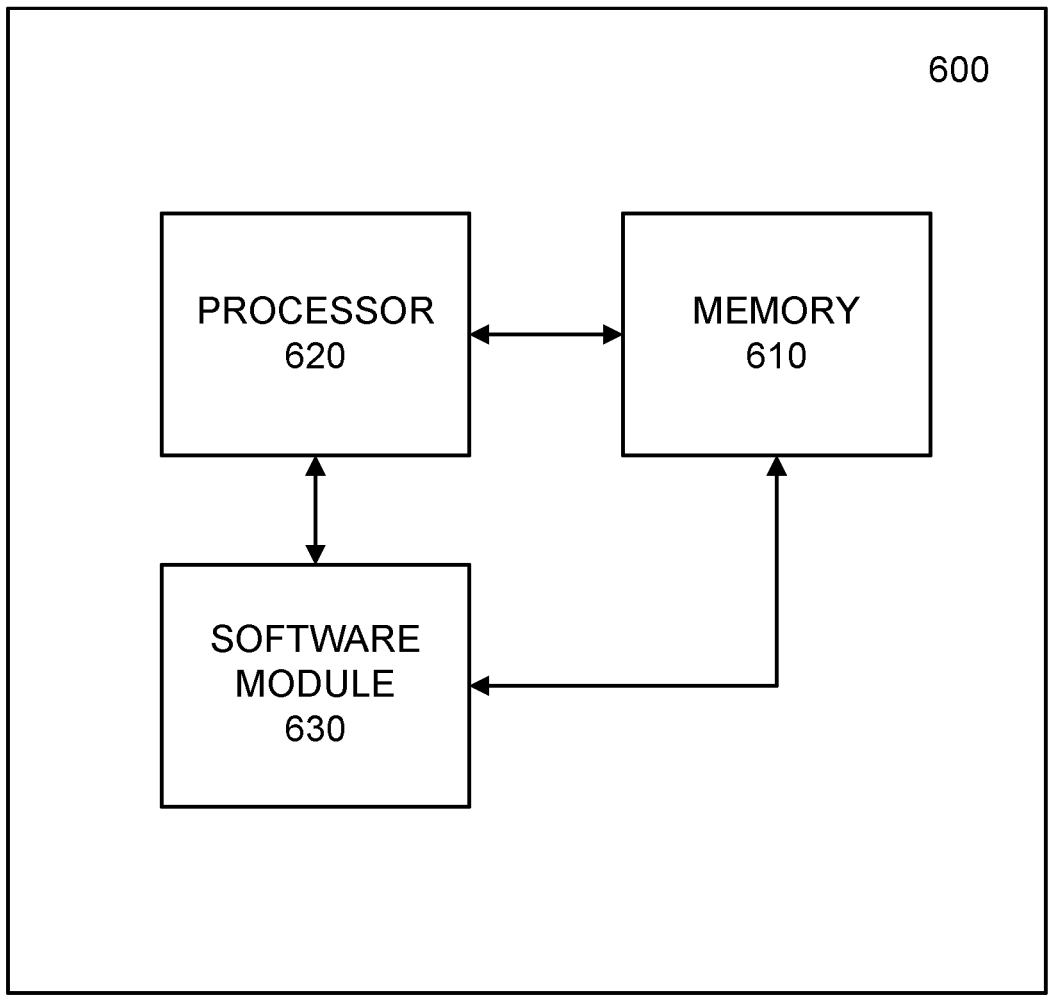
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   compiling a code set via a compiler application;
   identifying one or more run-time errors associated with the compiled code set;
   identifying one or more user profiles linked to portions of the code set where the one or more run-time errors occurred;
   automatically initiating a conference session with one or more devices associated with the one or more user profiles linked to the portions of the code set where the one or more run-time errors occurred;
   receiving modified portions of the code set from the one or more devices;
   compiling the modified portions of the code set; and
   when the compiled modified portions of the code set are free from run-time errors, closing the conference session and forwarding the modified portions of the code set to a master build of the code set.

2. The method of claim 1, wherein the conference session is automatically initiated when the one or more run-time errors are deemed critical.

3. The method of claim 2, wherein the one or more run-time errors are deemed critical when the one or more run-time errors include one or more critical variables.

4. The method of claim 1, comprising:
   copying the portions of the code set comprising the one or more run-time errors; and
   forwarding the copied portions of the code set to the one or more devices during the conference session.

5. The method of claim 1, wherein the one or more user profiles comprises a creation record of one or more portions of the code set, and a plurality of times and dates associated with the creation of the one or more portions of the code set.

6. The method of claim 1, comprising:
   transmitting conference invite messages for the conference session to the one or more devices associated with the one or more user profiles which are linked to portions of the code set where the run-time errors occurred and which exceed a threshold number of the run-time errors.

7. An apparatus comprising:
   a processor configured to
   compile a code set via a compiler application;
   identify one or more run-time errors associated with the compiled code set;
   identify one or more user profiles linked to portions of the code set where the one or more run-time errors occurred; and
   automatically initiate a conference session with one or more devices associated with the one or more user profiles linked to the portions of the code set where the one or more run-time errors occurred;
   receive modified portions of the code set from the one or more devices;
   compile the modified portions of the code set; and
   when the compiled modified portions of the code set are free from run-time errors, close the conference session and forward the modified portions of the code set to a master build of the code set.

8. The apparatus of claim 7, wherein the conference session is automatically initiated when the one or more run-time errors are deemed critical.

9. The apparatus of claim 8, wherein the one or more run-time errors are deemed critical when the one or more run-time errors include one or more critical variables.

10. The apparatus of claim 7, wherein the processor is further configured to
    copy the portions of the code set comprising the one or more run-time errors; and
    a transmitter is configured to forward the copied portions of the code set to the one or more devices during the conference session.

11. The apparatus of claim 7, wherein the one or more user profiles comprises a creation record of one or more portions of the code set, and a plurality of times and dates associated with the creation of the one or more portions of the code set.

12. The apparatus of claim 7, comprising:
    a transmitter configured to transmit conference invite messages for the conference session to the one or more devices associated with the one or more user profiles which are linked to portions of the code set where the run-time errors occurred and which exceed a threshold number of the run-time errors.

13. A non-transitory computer readable storage medium configured to store instructions that when executed cause a processor to perform:
    compiling a code set via a compiler application;
    identifying one or more run-time errors associated with the compiled code set;
    identifying one or more user profiles linked to portions of the code set where the one or more run-time errors occurred; and
    automatically initiating a conference session with one or more devices associated with the one or more user profiles linked to the portions of the code set where the one or more run-time errors occurred;
    receiving modified portions of the code set from the one or more devices;
    compiling the modified portions of the code set; and when the compiled modified portions of the code set are free from run-time errors, closing the conference session and forwarding the modified portions of the code set to a master build of the code set.

14. The non-transitory computer readable storage medium of claim 13, wherein the conference session is automatically initiated when the one or more run-time errors are deemed critical.

15. The non-transitory computer readable storage medium of claim 14, wherein the one or more run-time errors are deemed critical when the one or more run-time errors include one or more critical variables.

16. The non-transitory computer readable storage medium of claim 13 wherein the processor is further configured to perform:
   copying the portions of the code set comprising the one or more run-time errors; and
   forwarding the copied portions of the code set to the one or more devices during the conference session.

17. The non-transitory computer readable storage medium of claim 13, wherein the one or more user profiles comprises a creation record of one or more portions of the code set, and a plurality of times and dates associated with the creation of the one or more portions of the code set.

* * * * *